United States Patent [19]

Goto et al.

[11] Patent Number: 5,066,534

[45] Date of Patent: Nov. 19, 1991

[54] MAGNETIC RECORDING MEDIUM

[75] Inventors: Narito Goto; Yasuo Ando, both of Tokyo, Japan

[73] Assignee: Konica Corporation, Tokyo, Japan

[21] Appl. No.: 560,207

[22] Filed: Jul. 31, 1990

[30] Foreign Application Priority Data

Aug. 11, 1989 [JP] Japan .................................. 1-209271

[51] Int. Cl.$^5$ ............................................. G11B 23/00
[52] U.S. Cl. .................................... 428/212; 428/336; 428/694; 428/900
[58] Field of Search ............... 428/212, 336, 694, 900; 427/131

[56] References Cited

U.S. PATENT DOCUMENTS

| | | | |
|---|---|---|---|
| 4,246,316 | 1/1981 | Aonuma et al. | 427/131 |
| 4,259,392 | 3/1981 | Suzuki | 428/900 |
| 4,410,190 | 10/1983 | Kawahara et al. | 428/900 |
| 4,624,883 | 11/1986 | Yamaguchi et al. | 428/900 |
| 4,624,894 | 11/1986 | Kishimoto et al. | 428/900 |
| 4,857,388 | 8/1989 | Ogawa et al. | 428/694 |

Primary Examiner—Paul J. Thibodeau
Attorney, Agent, or Firm—Finnegan, Henderson, Farabow, Garrett and Dunner

[57] ABSTRACT

A magnetic recording medium having excellent properties is disclosed. The recording medium comprises a non-magnetic support and provided thereon at least two magnetic layers, wherein the lower magnetic layer of the at least two layers has a Young's modulus which is larger than that of the upper magnetic layer and is not less than 800 kg/mm$^2$.

8 Claims, 3 Drawing Sheets

MAGNETIC RECORDING MEDIUM

FIELD OF THE INVENTION

The present invention relates to a magnetic recording medium such as a magnetic tape, a magnetic sheet and a magnetic disk.

BACKGROUND OF THE INVENTION

Generally, a magnetic recording medium such as a magnetic tape is prepared by coating on a support a magnetic coating material comprising a magnetic powder and a binder resin, followed by drying.

In recent years, efforts have been made to develop a magnetic video tape having high image quality. For this purpose, recording frequency has been shifted to a higher range, which in turn has resulted in causing such problems as rubbing noise due to a scratch or dust on a magnetic head and deterioration of high frequency characteristics, in particular, deterioration of an output and S/N ratio in a higher range due to stain of the head. In an extreme case, such deterioration results in highlight tearing.

It is generally known that rubbing noise and stain of a magnetic head can be eliminated to some extent by increasing a Young's modulus of a magnetic layer. However, an increased Young's modulus is liable to result in a too hard magnetic layer and magnetic tape surface, which in turn results in a fragile surface of the tape and therereforce deterioration of still-flame durability and electromagnetic conversion properties.

SUMMARY OF THE INVENTION

The object of the present invention is to provide a magnetic recording medium free of rubbing noise and magnetic head stain and capable of providing excellent still-flame durability and electromagnetic conversion properties.

The above object can be attained by a magnetic recording medium comprising a support and provided thereon a non-magnetic layer consisting of at least two layers, wherein the lower layer of the magnetic layers has a Young's modulus which is larger than that of the upper layer and is not less than 800 kg/mm$^2$.

Figure 1:
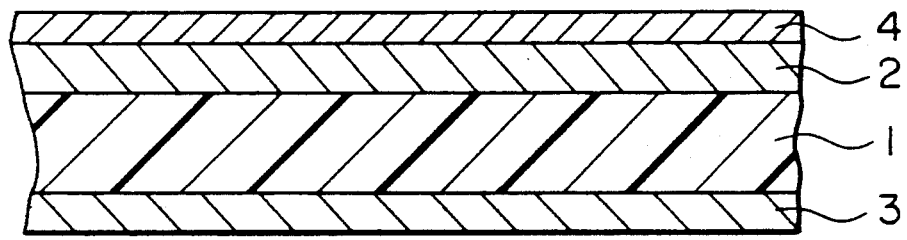
FIGS. 1 and 2 are cross-sectional views of one form of the magnetic recording medium of the invention.

1: A non-magnetic support
2: A lower magnetic layer
3: A back coating layer
4, 6: Upper magnetic layers
5: An intermediate magnetic layer

DETAILED DESCRIPTION OF THE INVENTION

The magnetic recording medium of the invention has a multilayer structure in which the lower magnetic layer has such a large Young's modulus as not less than 800 kg/mm$^2$ and the upper magnetic layer has a Young's modulus smaller than that of the lower magnetic layer. Accordingly, the magnetic recording medium can have an appropriate Young's modulus as a whole, which results in improving high frequency properties such as an output and an S/N ratio in a higher range as well as improving rubbing noise and magnetic head contamination, and the surface of the recording medium has such suitable hardness that still-flame durability and electromagnetic conversion properties can be maintained at a sufficiently high level. A magnetic layer having a single-layer structure and such a large Young's modulus as not less than 800 kg/mm$^2$ will make the surface too hard and cause deterioration of still-flame durability and electromagnetic conversion properties.

In the present invention, the Young's modulus of the lower magnetic layer is not less than 800 kg/mm$^2$ and not more than 1,200 kg/mm$^2$, preferably 900 to 1000 kg/mm$^2$. The Young's modules exceeding this upper limit will make the whole recording medium too hard and cause problems in running properties and durability. The upper magnetic layer has a Young's modulus smaller than that of the lower magnetic layer, preferably 500 to 800 kg/mm$^2$, more preferably 650 to 750 kg/mm$^2$.

The Young's modulus of each layer can be controlled to the preceding levels by the kind of a binder and the amount of an additive (in particular, fatty acids and esters thereof). The Young's modulus of the lower layer can be controlled to not less than 800 kg/mm$^2$ by combination of vinyl chloride and polyurethane as the binder resin, in which the vinyl chloride/polyurethane weight ratio is in the range of 50/50 to 80/20 and the glass transition temperature (Tg) of polyurethane is not lower than $-20°$ C., preferably not lower than $0°$ C. Fatty acid is added in a content of not more than 2.0% by weight, preferably 0.5 to 1.5% by weight of magnetic powder, and fatty ester in a content of not more than 1.0% by weight, preferably 0.25 to 0.75% by weight of magnetic powder. It should be noted that the content of fatty ester is smaller than ordinary cases.

The upper magnetic layer is of the same condition as above, except that the content of fatty ester is 0.7 to 1.5% by weight of magnetic powder.

To increase a chroma output and an audio output of the recording medium in a lower frequency range, the lower magnetic layer contains preferably a non-magnetic powder and carbon black each having a Morse hardness of not less than 6 in an amount of not more than half of that in the upper layer. A relatively less amount of non-magnetic powder contained in the lower magnetic layer increases magnetic powder packing ratio and contributes to increasing an output in a lower frequency range.

The recording medium of the invention comprising a plural of the magnetic layers can have a layer structure so that the upper layer has a function of improving recording and reproduction characteristics in a higher frequency range such as a video output and the lower layer has a function of improving recording and reproduction characteristics in a relatively lower frequency range such as a chroma output and an audio output.

For this purpose, it is required that the coersive force (Hc) of the upper layer (in particular, the uppermost layer) be larger than that of the lower layer and the thickness of the upper layer be preferably not more than 0.6 $\mu$m. The thickness of the lower layer adjacent to the upper layer be preferably 1.5 to 4.0 $\mu$m.

In the present invention, plural magnetic layers are adjacent preferably to each other. It is preferable that the uppermost layer of these plural layers be the preceding upper layer and the layer adjacent to this uppermost layer be the preceding lower layer. Generally, a clear boundary exists between the adjacent two layers, but there are some cases where two layers are separated by a boundary area with a certain thickness, which contains magnetic powder of both layers. In such cases, the preceding upper and lower layers are defined by the preceding upper and lower layers excluding such boundary area. The magnetic recording medium of the invention may be prepared by the wet-on-wet method in which the layers are provided simultaneously in a wet state, or by the wet-on-dry method in which coating and drying are repeated for each layer.

Figure 2:
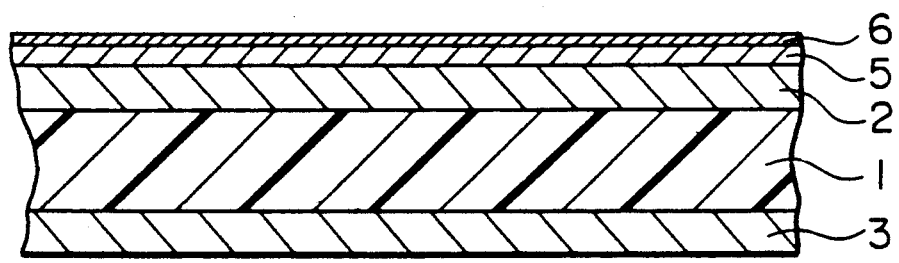

FIG. 1 shows one form of the magnetic recording medium of the invention, in which the first magnetic layer 2 and the second magnetic layer 4 are formed in this sequence on the non-magnetic support 1 of polyethylene terephthalate. In the figure, a back coating layer is provided on the opposite side, which is not essential. An over coating layer may be provided on the second magnetic layer. In the magnetic recording medium shown in FIG. 2, the upper layer is further divided into the layers 5 and 6, in which the total thickness of the layers 5 and 6 is preferably not more than 0.6 μm.

The examples of magnetic powder used in the invention are ferromagnetic powders including iron oxide magnetic powders such as $\gamma$-$Fe_2O_3$, Co-containing $\gamma$-$Fe_2O_3$, $Fe_3O_4$ and Co-containing $Fe_3O_4$; and magnetic metal powders composed mainly of Fe, Ni and Co, such as Fe, Ni, Co, Fe-Ni-Co alloys, Fe-Ni alloys, Fe-Al alloys, Fe-Al-Ni alloys, Fe-Al-Co alloys, Fe-Mn-Zn alloys, Fe-Ni-Zn alloys, Fe-Al-Ni-Co alloys, Fe-Al-Ni-Cr alloys, Fe-Al-Co-Cr alloys, Fe-Co-Ni-Cr alloys, Fe-Co-Ni-P alloys and Co-Cr alloys.

From the above-listed magnetic substances, suitable ones can be selected so that the coersive force of the upper magnetic layer is higher than that of the lower magnetic layer in order to prepare the recording medium having a high output.

Each magnetic layer may also contain various additives including a lubricant such as silicone oil, graphite, molybdenum disulfide, tungsten disulfide, fatty acid, and fatty ester; an abrasive such as fused alumina; and an anti-static agent such as carbon black and graphite. It is preferred that the lower magnetic layer contains carbon black and non-magnetic powder each having a Morse hardness of not less than 6 in an amount not more than half of that contained in the upper layer. Examples of the non-magnetic powder, besides the preceding fused alumina, are chromium oxide, titanium oxide, $\alpha$-$Fe_2O_3$, silicon oxide, silicon nitride, silicon carbide, zirconium oxide, zinc oxide, cerium oxide, magnesium oxide and boron nitride. The average particle diameter of these abrasives is preferably not more than 0.6 μm.

The binder usable in the magnetic layers 2, 4, 5 and 6 has preferably an average molecular weight of 10,000 to 200,000. The examples thereof are vinyl chloride/vinyl acetate copolymer, a vinyl chloride/vinylidene chloride copolymer, a vinyl chloride/acrylonitrile copolymer, polyvinyl chloride, a urethane resin, a butadiene/acrylonitrile copolymer, a polyamide resin, polyvinyl butyral, a cellulose derivative such as cellulose acetate butyrate and cellulose diacetate, a styrene/butadiene copolymer, a polyester resin, synthetic rubbers, a phenol resin, an epoxy resin, a urea resin, a melamine resin, a phenoxy resin, a silicone resin, an acrylic reactive resin, a mixture of a high molecular weight polyester resin and an isocyanate prepolymer, a mixture of polyester polyol and polyisocyanate, a urea-formaldehyde resin, and a mixture of a low molecular weight glycol, a high molecular weight diol and isocyanate. These are employed either singly or in mixture.

It is preferred that these binder resins have a hydrophilic polar group such as —$SO_3M$, —COOM, and —$PO(OM')_2$, wherein M represents hydrogen or an alkali metal such as lithium, potassium and sodium; and M' represents hydrogen, an alkali metal or a hydrocarbon residue. Such polar group improves an affinity between a binder resin and magnetic powder and an increased affinity in turn improves dispersibility of the magnetic powder to prevent flocculation of the magnetic powder, which makes a coating liquid stable and contributes to improving the durability of a magnetic recording medium.

The binder resin, in particular, a vinyl chloride copolymer, can be prepared by copolymerization of a vinyl chloride monomer with a copolymerizable monomer containing an alkaline salt of sulfonic acid or phosphoric acid and if necessary, other copolymerizable monomers. This copolymer can be readily prepared by vinyl polymerization and the monomer components are selected so that the optimum properties can be provided to the copolymer.

The metal for the alkaline salt of sulfonic acid or phophoric acid is an alkaline metal such as sodium, potassium and lithium, preferably potassium in respect of solubility, reactivity and yield.

The back coating layer 3 is provided by coating the binder resin containing a non-magnetic powder such as barium sulfide on the backside of a support.

The examples of the support are plastics such as polyethylene terephthalate and polypropylene, metals such as Al and Zn, and ceramics such as glass, boron nitride, Si carbide, porcelain and earthenware.

Figure 3:
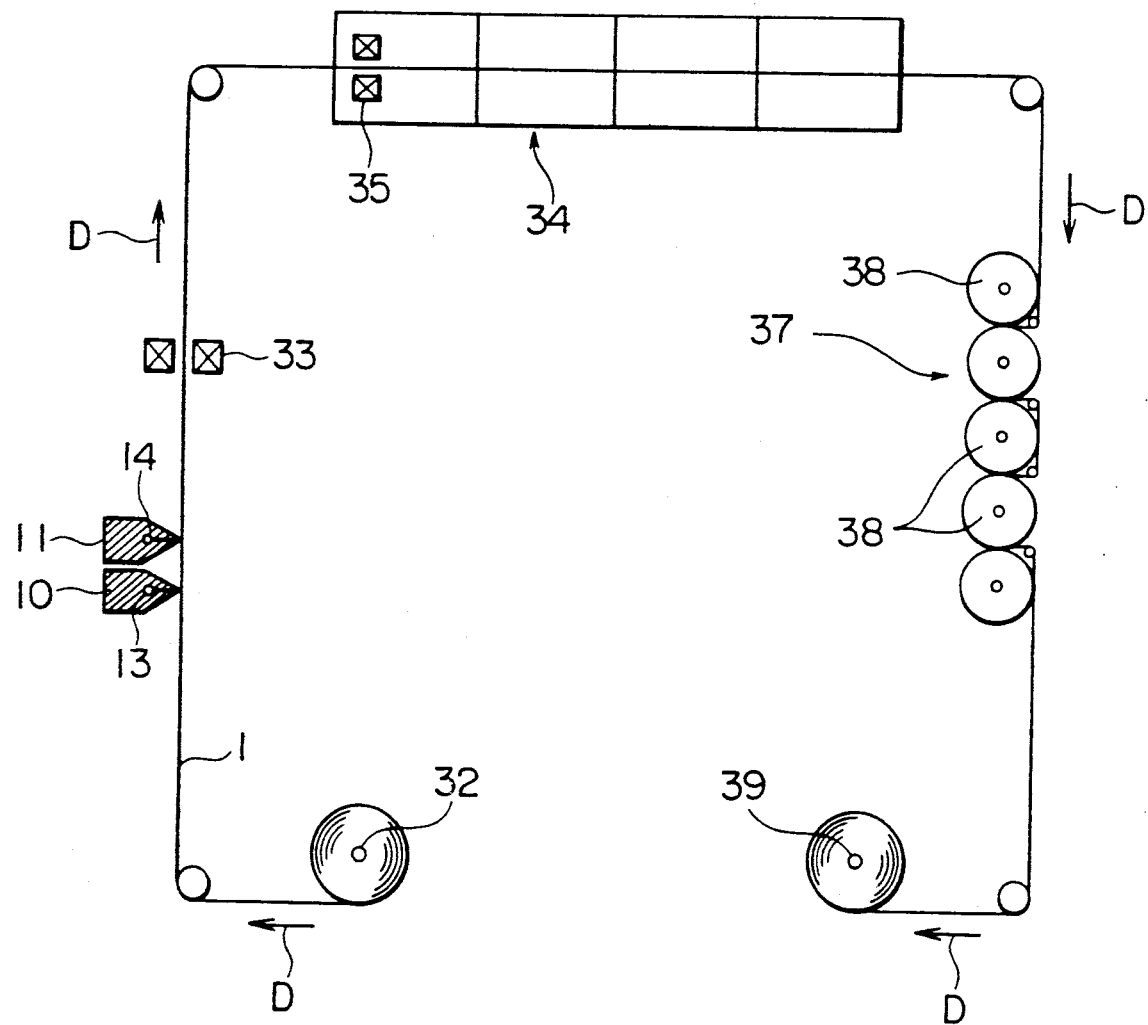
FIG. 3 is a schematic view of a device for preparing the magnetic recording medium of the invention.

FIG. 3 shows one form of an apparatus for preparing the magnetic recording medium of the present invention. The process of preparing the recording medium shown in FIG. 1 will be explained with reference to this figure.

The coating materials for the magnetic layers 2 and 4 are applied on the film support 1 supplied from the roll 32 with extrusion coaters 10 and 11. Then, the support is subjected to magnetic orientation by means of the pre-orientation magnet 33 of 2,000 gause, and transported to the dryer 34 equipped with the post-orientation magnet 35 of 2,000 gause, where the support is dried by hot air from upper and lower nozzles provided therein. The dried support on which the layers are provided is then supplied to the super calendaring unit 37 consisting of a plurality of the calendar rolls 38. After calendaring, the support is rolled round the roll 39. Each coating material may be supplied to the coaters 10 and 11 through an inline mixer (not shown). In this figure, an arrow D indicates the direction of conveying the support. The extrusion coaters 10 and 11 are respectively equipped with the liquid reservoirs 13 and 14 and the coating materials are applied by the wet-on-wet method. In preparing the recording medium shown in FIG. 2, one more extrusion coater is equipped to the apparatus of FIG. 3.

EXAMPLES

The present invention will be described in more detail in accordance with the following Examples. In the following examples, all "parts" mean "parts by weight".

The following compositions were kneaded and dispersed by a sand mill to obtain the respective coating materials.

| Coating material A for the upper layer | |
|---|---|
| Co-γ-Fe$_2$O$_3$ (Hc: 900 Oe, BET value: 50 m$^2$/g, average major axis length: 0.16 μm) | 100 parts |
| Vinyl chloride resin having a potassium sulfonate group (MR110, manufactured by Nippon Zeon Co., Ltd) | 10 parts |
| Polyurethane containing $(\text{---}\!\!\!\!\bigcirc\!\!\!\!\text{---}\overset{\overset{CH_3}{|}}{\underset{\underset{CH_3}{|}}{C}}\!\!\!\!\text{---}\!\!\!\!\bigcirc\!\!\!\!\text{---})$ (manufactured by Takeda Chemical Industries Ltd.) | 5 parts |
| α-Al$_2$O$_3$ (Morse hardness: 9, average diameter: 0.2 μm) | 6 parts |
| Carbon black (average diameter: 30 mμ) | 1 part |
| Myristic acid | 1 part |
| Stearic acid | 1 part |
| Butyl stearate | 1 part |
| Colonate L (manufactured by Nippon Polyurethane Industry Co., Ltd.) | 5 parts |
| Coating material B for the lower layer | |
| Co-γ-Fe$_2$O$_3$ (Hc: 700 Oe, BET value: 38 m$^2$/g, average major axis length: 0.24 μm) | 100 parts |
| Vinyl chloride resin having a potassium sulfonate group (MR110, manufactured by Nippon Zeon Co., Ltd) | 10 parts |
| Polyurethane containing $(\text{---}\!\!\!\!\bigcirc\!\!\!\!\text{---}\overset{\overset{CH_3}{|}}{\underset{\underset{CH_3}{|}}{C}}\!\!\!\!\text{---}\!\!\!\!\bigcirc\!\!\!\!\text{---})$ (manufactured by Takeda Chemical Industries Ltd.) | 5 parts |
| α-Al$_2$O$_3$, shown in Table 1 (Morse hardness: 9, average diameter: 0.2 μm) | |
| Carbon black (average diameter: 30 mμ), shown in Table 1 | |
| Myristic acid | 0.5 part |
| Stearic acid | 0.5 part |
| Butyl stearate | 0.5 part |
| Colonate L (manufactured by Nippon Polyurethane Industry Co., Ltd.) | 5 parts |

Next, the coating material B for the lower layer and the coating material A for the upper layer were applied on a polyethylene terephthalate base film in sequence with the apparatus shown in FIG. 3, followed by orientation, drying and calendaring. The dry thicknesses of the upper and lower layers were 0.5 μm and 2.5 μm, respectively.

On the opposite side of the support, a coating material for the back coating layer having the following composition was coated to a dry thickness of 0.8 μm.

| Carbon black (Raven 1035) | 40 parts |
|---|---|
| Barium sulfide (average diameter: 300 mμ) | 10 parts |
| Nitrocellulose | 25 parts |
| N-2301 (manufactured by Nippon Polyurethane Industry Co., Ltd.) | 25 parts |
| Colonate L (manufactured by Nippon Polyurethane Industry Co., Ltd.) | 10 parts |
| Cyclohexanone | 400 parts |
| Methyl ethyl ketone | 250 parts |
| Toluene | 250 parts |

Thus, a wide magnetic film was prepared and rolled up. The film was then cut into ½ inch-wide tapes to prepare vide tape samples shown in Table 1.

The properties of each tape sample were evaluated, and the results are shown in Table 1.

(a) RF output, Lumi S/N, and Chroma S/N, and Chroma output: measured with a video deck HR-S7000 (manufactured by Japan Victor Co., Ltd.) and a noise meter 921 D/1 (manufactured by Shibasoku) and indicated by the values (dB) to a reference tape. The frequency of each signal was as follows:

| RF output | 6 MHz |
|---|---|
| Lumi S/N | 6 MHz |
| Chroma S/N | 629 KHz |
| Chroma output | 629 KHz |

(b) HiFi audio output: measured with a video deck BR-S711 (manufactured by Japan Victor Co., Ltd.) and indicated by the value (dB) to a reference tape. The frequency of the output signal was 1.7 KHz.

(c) Linear audio output: measured with a video deck BR-S 711 (manufactured by Japan Victor Co., Ltd.) and indicated by the value (dB) to a reference tape. The frequency of the output signal was 1 KHz.

(d) Rubbing noise (measurement conditions: 20° C./RH10%, video deck for measurement: HR-S7000 manufactured by Japan Victor Co., Ltd.):
   (i) playback was performed without running a tape, and system noise was measured by a spectrum analyzer;
   (ii) one minute playback was repeated ten times for each sample tape, and rubbing noise was measured by a spectrum analyzer;
   (iii) the level of noise at around 8 MHz was obtained by calculating an average value of noises in 10 passings based on the system noise as a standard (0 dB).

(e) Head stain (Video deck for measurement: HR-S7000 manufactured by Japan Victor Co., Ltd.):
   (i) a 6 MHz signal was recorded for 10 minutes at 20° C. and RH65%, followed by playback three times;
   (ii) an 8 MHz signal was recorded for 2 minutes at 20° C. and RH65%, and a playback output was measured by a spectrum analyzer (measurement value A);
   (iii) the magnetic tape was run over a whole length at 20° C. and RH20%;
   (iv) an 8 MHz signal was recorded for 2 minutes at 20° C. and RH20%, and a playback output was measured by a spectrum analyzer (measurement value B);
   (v) a difference between A and B (A-B) indicates lowering of the output.

Stain of a magnetic head was observed visually and evaluated according to the following criterion:
⊚ No stain observed on a glass portion.
o Slight stain
x Stain observed on the entire surface of the glass portion.

(f) Still-flame durability: time required for lowering a playback output of a still-flame image by 2 dB was indicated in terms of minute.

TABLE 1

|  |  | Invention 1 | Invention 2 | Invention 3 | Invention 4 | Comparison 1 | Comparison 2 | Comparison 3 | Comparison 4 | Comparison 5 |
| --- | --- | --- | --- | --- | --- | --- | --- | --- | --- | --- |
| Young's modulus of the upper layer (kg/mm$^2$) | | 710 | 710 | 710 | 650 | 710 | 650 | 900 | 710 | 900 |
| Young's modulus of the lower layer (kg/mm$^2$) | | 900 | 810 | 900 | 840 | 680 | 770 | 680 | 710 | 900 |
| $\alpha$-Al$_2$O$_3$ (Lower layer, to magnetic powder) | | None | None | 1% | None | None | None | None | 7% | 7% |
| Carbon black (Lower layer, to magnetic powder) | | None | None | 0.2% | None | None | None | None | 1% | 1% |
| RF output | (dB) | +2.6 | +2.5 | +2.5 | +2.6 | +2.7 | +2.6 | +2.6 | +2.7 | +1.8 |
| Lumi S/N | (dB) | +2.5 | +2.5 | +2.5 | +2.5 | +2.6 | +2.6 | +2.4 | +2.6 | +1.8 |
| Chroma output | (dB) | +1.8 | +1.8 | +1.7 | +1.7 | +1.9 | +1.8 | +1.7 | +1.9 | +0.8 |
| Chroma S/N | (dB) | +2.0 | +1.9 | +1.8 | +2.1 | +2.2 | +2.1 | +1.9 | +2.0 | +1.1 |
| HiFi audio output | (dB) | +2.9 | +2.7 | +2.7 | +2.8 | +2.8 | +2.9 | +2.8 | +2.9 | +2.0 |
| Linear audio output | (dB) | +2.8 | +2.6 | +2.6 | +2.7 | +2.8 | +2.8 | +2.7 | +2.8 | +2.1 |
| Rubbing noise | (8 MHz) | +3.0 | +3.5 | +2.8 | +3.4 | +6.5 | +6.9 | +5.5 | +6.7 | +3.8 |
| Head stain (Lowering of output at 8 MHz) | (dB) | −0.5 | −0.8 | −0.4 | −0.7 | −1.9 | −2.1 | −1.6 | −1.9 | −0.5 |
| (Observation of head) | | ⊚ | ○ | ⊚ | ○ | x | x | x | x | ⊚ |
| Still-flame durability | (min) | >120 | >120 | >120 | >120 | >120 | >120 | >120 | >120 | 8 |

As is apparent from the results, compared with the comparative samples, the magnetic tape samples of the invention (Examples 1 to 4), in which the Young's modulus of the lower magnetic layer is not less than 800 kg/mm$^2$ and larger than that of the upper magnetic layer, have much less rubbing noise and head stain and more excellent outputs and S/N ratios as well as significantly improved still-flame durability.

Figure 4:
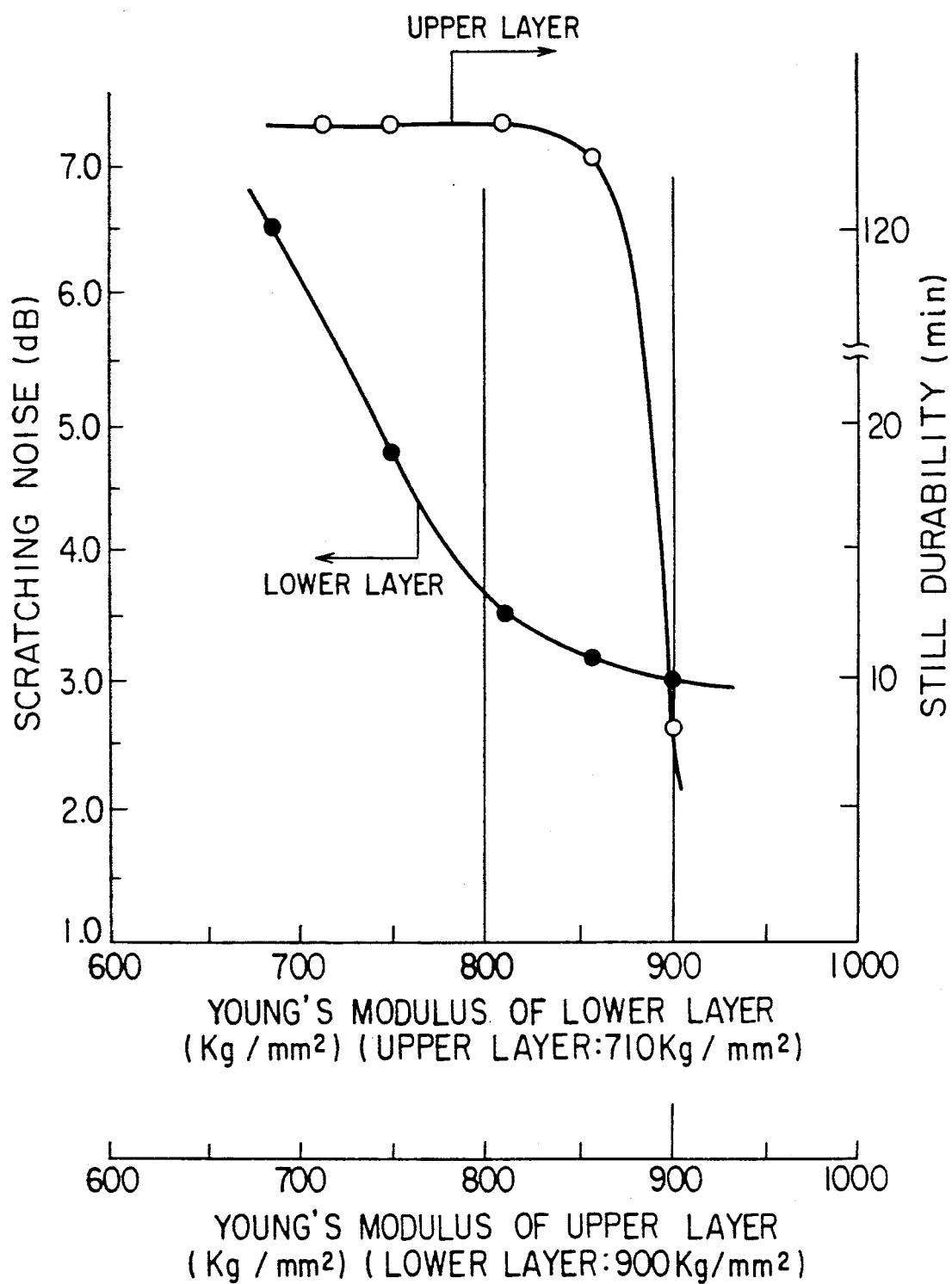
FIG. 4 shows a relationship between the Young's modulus of each layer and the properties of a magnetic recording medium.

To observe the influence of the Young's modulus on the properties of a magnetic tape, the Young's moduli of the upper and lower layers were varied. The results are shown in FIG. 4.

It can be understood from the results that rubbing noise was considerably suppressed by making the Young's modulus of the lower layer not less than 800 kg/mm$^2$ and that head stain and still-flame durability were improved notably when the Young's modulus of the lower layer was larger than that of the upper layer.

The evaluation of properties was also performed for a magnetic tape, in which a magnetic layer has a three layer structure (layers 2, 5 and 6); the upper magnetic layer 6 corresponds to the layer 4 shown in FIG. 1, and has a thickness of 0.3 μm; the interlayer 5 has an Hc value of 800 Oe, which is the mean value those of the layers 2 and 4, and the thickness of 0.3 μm; and the lower layer 2 corresponds to that shown in FIG. 1. The results shown in Table 2 reveal that the magnetic recording media of the invention have more excellent properties than those of the comparative one as was the case in the recording media of the two layer structure.

TABLE 2

|  |  | Invention 5 | Invention 6 | Comparison 6 |
| --- | --- | --- | --- | --- |
| Young's modulus of the upper layer | (kg/mm$^2$) | 710 | 710 | 650 |
| Young's modulus of the interlayer | (kg/mm$^2$) | 900 | 900 | 770 |
| Young's modulus of the upper layer | (kg/mm$^2$) | 900 | 710 | 770 |
| $\alpha$-Al$_2$O$_3$ (Interlayer, to magnetic powder) | | None | None | None |
| Carbon black (Interlayer, to magnetic powder) | | None | None | None |
| $\alpha$-Al$_2$O$_3$ (Lower layer, to magnetic powder) | | None | None | None |
| Carbon black (Lower layer, to magnetic powder) | | None | None | None |
| RF output | (dB) | +2.6 | +2.6 | +2.7 |
| Lumi S/N | (dB) | +2.5 | +2.6 | +2.6 |
| Chroma output | (dB) | +1.8 | +1.9 | +1.8 |
| Chroma S/N | (dB) | +2.0 | +2.0 | +2.0 |
| HiFi audio output | (dB) | +2.8 | +2.8 | +2.7 |
| Linear audio output | (dB) | +2.8 | +2.9 | +2.7 |
| Rubbing noise | (8 MHz) | +2.9 | +3.7 | +6.7 |
| Head stain (Lowering of output at 8 MHz (dB)) | | −0.4 | −0.8 | −2.0 |
| (Observation of head) | | ⊚ | ○ | x |
| Still durability | (min) | >120 | >120 | >120 |

What is claimed is:

1. A magnetic recording medium comprising a nonmagnetic support and provided thereon at least two magnetic layers each containing a ferromagnetic powder and a binder, wherein a lower magnetic layer of the at least two layers has a Young's modulus which is larger than that of an upper magnetic layer of the at least two layers and is not less than 800 kg/mm$^2$.

2. The recording medium of claim 1, wherein the Young's modulus of the lower magnetic layer is 800 to 1200 kg/mm$^2$.

3. The recording medium of claim 2, wherein the Young's modulus is 900 to 1000 kg/mm$^2$.

4. The recording medium of claim 1, wherein the Young's modulus of the upper magnetic layer is 500 to 800 kg/mm$^2$.

5. The recording medium of claim 4, wherein the Young's modulus is 650 to 750 kg/mm$^2$, 6. The recording medium of claim 4, wherein a coercive force of the upper magnetic layer is larger than that of the lower magnetic layer.

7. The recording medium of claim 4, wherein a thickness of the upper magnetic layer is not more than 0.6 μm.

8. The recording medium of claim 2, wherein a thickness of the lower magnetic layer is 1.5 to 4.0 μm.

* * * * *